United States Patent
Menezes et al.

(10) Patent No.: US 8,045,548 B1
(45) Date of Patent: Oct. 25, 2011

(54) DATA STREAM LABELING AND PROCESSING

(75) Inventors: Evandro Menezes, Austin, TX (US);
Dave Tobias, Pflugerville, TX (US);
Morrie Altmejd, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 3278 days.

(21) Appl. No.: 10/113,340

(22) Filed: Mar. 29, 2002

(51) Int. Cl.
*H04L 12/28* (2006.01)

(52) U.S. Cl. .................. 370/389; 370/392; 370/401

(58) Field of Classification Search .......... 370/402, 370/410, 401, 389, 392, 395.41, 232, 451, 370/396, 400, 465, 395.21, 395.3, 428, 429; 710/2, 428, 107, 100, 110, 112
See application file for complete search history.

(56) References Cited

U.S. PATENT DOCUMENTS

| | | | |
|---|---|---|---|
| 6,445,711 B1 * | 9/2002 | Scheel et al. | 370/402 |
| 6,744,789 B1 * | 6/2004 | Michener | 370/509 |
| 6,751,684 B2 * | 6/2004 | Owen et al. | 710/29 |
| 6,876,653 B2 * | 4/2005 | Ambe et al. | 370/389 |
| 6,993,611 B2 * | 1/2006 | Ajanovic et al. | 710/107 |
| 7,110,404 B1 * | 9/2006 | Temoshenko | 370/390 |

* cited by examiner

*Primary Examiner* — Hanh Nguyen
(74) *Attorney, Agent, or Firm* — Zagorin O'Brien Graham LLP

(57) ABSTRACT

A transaction is sent over a communication link to a receiving node. The transaction includes data along with a tag identifying a data type of the data. The receiving node either forwards or processes the data according to whether the data type matches the type of data type processed by circuitry associated with the receiving node. Thus, a destination is determined for data transported on the communication link using a data type identifier sent with the data.

17 Claims, 4 Drawing Sheets

| BIT TIME | 7 | 6 | 5 | 4 | 3 | 2 | 1 | 0 |
|---|---|---|---|---|---|---|---|---|
| 0 | SeqId[3:2] | | Cmd[5:0] | | | | | |
| 1 | PassPW | SeqId[1:0] | | UnitID[4:0] | | | | |
| 2 | Count[1:0] | | Data Type[5:0] | | | | | |
| 3 | Data Type [11:6] | | | | | | Count[3:2] | |
| 4 | SysMgtCmd[7:0] | | | | | | | |
| 5 | Addr[23:20] | | | | Data Type [15:12] | | | |
| 6 | Addr[31:24] | | | | | | | |
| 7 | Addr[39:32] | | | | | | | |

FIG. 3

DATA STREAM LABELING AND PROCESSING

BACKGROUND

1. Field of the Invention

This invention is related to electronic systems and more particularly to communication of data in such systems.

2. Description of the Related Art

In computer systems such as personal computer systems, advances in input/output (I/O) bandwidth have generally lagged the advances in processing speed. That performance gap has resulted in systems being "I/O bound", and as a result, the systems have been unable to fully exploit increased CPU processing speed.

I/O bandwidth has been determined in large part by the interconnect buses in the system. In conventional interconnect buses, a master device requests data from a slave device (or vice versa) and the bus remains tied up until the transaction completes. During the time the bus is waiting for either the sender or receiver of data to fulfill their part of the transaction, the bus is "busy", thus blocking access to the bus by other masters. In order to improve bus utilization, more modern buses allow the master to send a transaction request to the slave and immediately release the bus. When the slave is ready for the transaction, the slave acquires the bus and completes the transaction with the master. Between the time that the master initiates the transaction, and the slave completes it, other transactions may be started and/or completed. This technique is known as "split transaction". In this scheme, each transaction is "tagged" so that when the slave is ready to complete the transaction, the master knows the request to which it corresponds. It is also generally allowed that transactions be completed "out of order", that is, in a different order than the order in which they were initiated.

Other solutions have been developed to address I/O bandwidth limitations. One such solution utilizes a point-to-point interconnect in which the bus is actually a fast serial link between nodes connected in a daisy-chain fashion (one device is connected to the other in succession and passes on anything that is not intended for it in both directions). One such bus is the HyperTransport™ as described in the HyperTransport™ I/O Link Specification, Revision 1.03 dated Oct. 10, 2001. Such buses have made advances in reducing or eliminating the bottleneck caused by I/O bandwidth limitations and have thus increased the potential gain available from additional processing speed as it becomes available.

Another traditional way of making more CPU processing power available in addition to increasing I/O bandwidth has been to off load tasks from the main processor onto a specialized co-processor. That has been done, e.g., in graphics processing in conventional personal computer systems. In such systems, graphics processing is performed by integrated circuit(s) that are separate from the CPU. The graphics processing circuits may be may be located on a separate graphics card. A specialized bus such as the Accelerated Graphics Processing (AGP) bus couples the graphics processing circuits to the rest of the system. As shown in FIG. 1, which illustrates an exemplary current personal computer system, the AGP bus 11 couples the north bridge integrated circuit 13 to graphics card 15. The north bridge 13 functions as the memory controller (among other roles) for memory 17. The graphics card 15 may include one or more graphics chips as well as memory.

It would be desirable to further simplify the transmission of data in computer systems to enhance system performance. Further, it would be desirable to enable the offloading of additional functions from the processor on other specialized coprocessor functions.

SUMMARY

Accordingly, in one embodiment, a method is provided for transporting data over a communication link. The method includes sending data over the communication link to a receiving node along with a tag identifying a data type of the data. The receiving node either forwards or processes the data according to whether the data type matches the type of data type processed by circuitry associated with the receiving node.

In another embodiment a method is provides that includes identifying a destination for data transported via a communication link in an electronic system using a data type identifier sent with the data. The method may further include forwarding the data without processing the data when the data type identifier does not match a type of processing done by a recipient of the data and processing the data when the data type identifier does match processing performed by the recipient of the data.

In another embodiment an integrated circuit is provided that includes a first and second interface coupled to input and output terminals that are in turn coupled to receive and send data over a communication link. Control logic receives a data type indicator (that accompanied the received data) from the first interface and determines if the data type indicator matches a type of processing performed by the integrated circuit. The control logic responds if no match is found by causing the data to be forwarded with the data type indicator via the second interface without processing. The integrated circuit processes the data when the data type indicator matches the type of data processed by the integrated circuit.

In still another embodiment, a computer system is provided that includes a communication link and a plurality of nodes coupled to the communication link. At least one of the nodes is part of a specialized integrated circuit coupled to process a particular data type. Data is sent over the communication link with the data being identified by a data type identifier sent with the data that identifies the particular data type. If the data type matches the particular data type, the specialized integrated circuit process the data. Otherwise the data is forwarded on the communication link without processing the data.

BRIEF DESCRIPTION OF THE DRAWINGS

The present invention may be better understood, and its numerous objects, features, and advantages made apparent to those skilled in the art by referencing the accompanying drawings.

FIG. 3 is a block diagram of a packet structure according to one embodiment of the invention.

DESCRIPTION OF THE PREFERRED EMBODIMENT(S)

Figure 2:
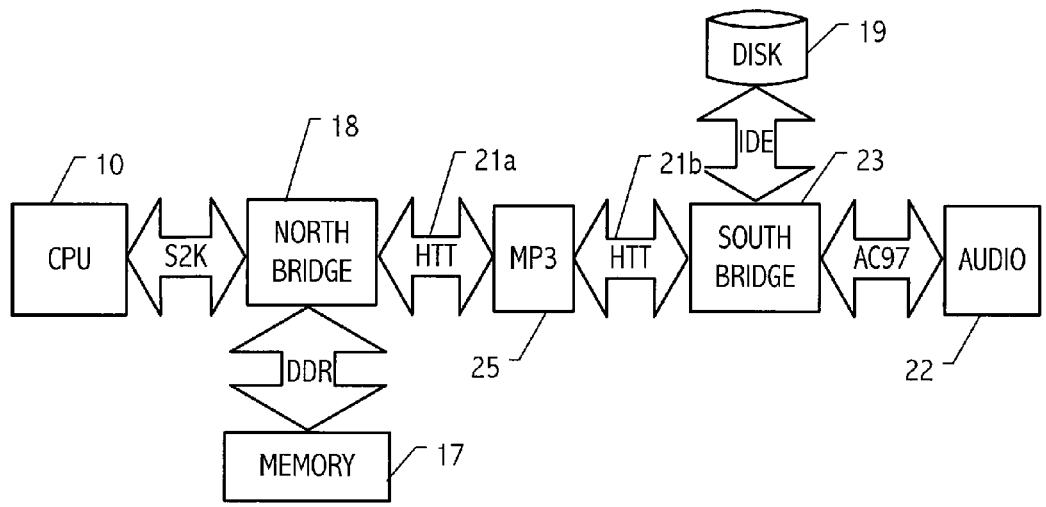
FIG. 2 is a block diagram of a system architecture suitable for exploiting an embodiment of the invention.

Referring to FIG. 2, in one embodiment, a communication link formed by separate point point-to-point links 21a and 21b, such as one conforming to the HyperTransport™ I/O Link specification, with the modifications as described herein, carries a tag that identifies the type of data that is being carried on the link and is associated with the tag. The tag may be implemented, e.g., as a 16 bit data type field, or a field of other appropriate length, e.g., a double word, that identifies the type of data being carried in the transaction. The data type field should be of an appropriate length to allow different number of data types to be easily identified and decoded. The data type field is a tag that is bound to the data proper, and thus is passed along the daisy chain (assuming a point to point interconnect such HyperTransport™ (HTT)) intact by those nodes that do not process data of that particular type until a node that does act on data identified by the data type tag accepts ownership of the data. Thus, the data tag identifies the destination of the data.

Figure 1:
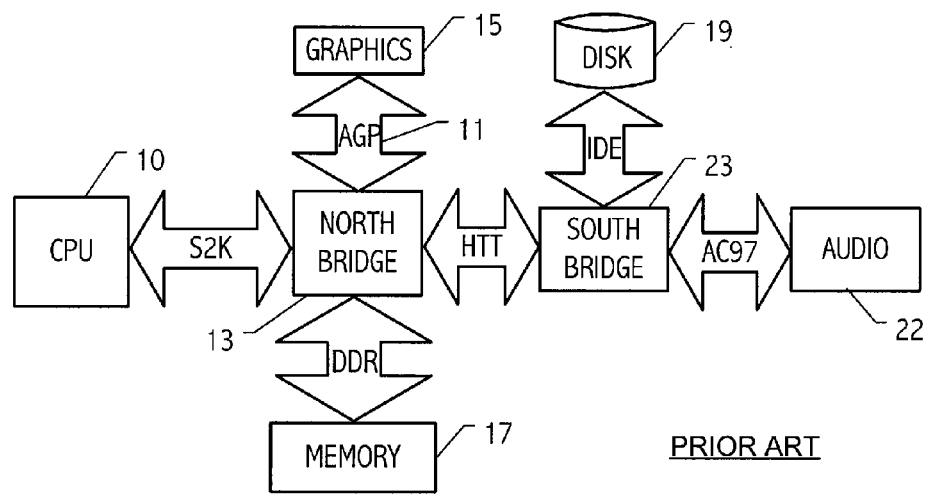
FIG. 1 is a block diagram of a prior art system architecture.

In a conventional system such as shown in FIG. 1 above, an audio file in a compressed format, such as MP3, on disk 19 that needs to be played on an audio device 22 that is basically a D/A converter, such as defined by AC97, would generally have to be loaded into memory 17 from the disk 19 and decompressed by the processor 10. The resulting PCM audio data would then be written back to memory 17 and eventually sent to the audio device 22 via the north bridge 13 and the south bridge 23.

In contrast, in one embodiment, as shown in FIG. 2, a special intermediary MP3 node 25 is inserted in the daisy chain between the north bridge 13 and the south bridge 23. Note that the IDE connection to disk 19 may be coupled to the north bridge 18 rather than the south bridge.

Note that in some implementations a transaction initiated by a downstream device may be routed upstream towards the host bridge and then down to its ultimate destination. The MP3 block 25 watches for a specific tag in a transaction passing through it that identify the accompanying data as an MP3 transaction. Depending on system implementation, the coprocessor MP3 block 25 may examine tags for transactions going upstream (towards the processor) or transactions going downstream (away from the processor) or both. For purposes herein, a transaction is a data transfer that includes a packet descriptor defining the command, e.g., a read or write, along with the data type tag, and a data payload. The packet includes additional fields that are dependent on the particular implementation of the communication link.

In one embodiment a packet of the type shown in FIG. 3 is utilized in which the data type [15:0] tag is a 16 bit field as shown. Other implementations of the data type tag are of course possible. Referring again to FIG. 2, when a data transaction with a matching tag comes in, instead of passing the transaction up or down the daisy chain, MP3 block 25 processes the received data. The MP3 block may then send the data to the appropriate place in the system with a new data type tag accompanying the data. The new data type tag would identify the data as processed audio data. Any transaction, i.e., a data transfer, without the proper tag, i.e. a tag that indicates other than MP3 data, is tunneled through the MP3 block untouched.

With an MP3 co-processor block 25, the MP3 file received from disk 19 could be streamed over the communication link 21 to the audio device 22 through the MP3 co-processor node 25, which would decompress the MP3 data before streaming it as PCM audio data to the AC97 audio device. Note that the MP3 data may be routed through the host bridge on north bridge 18 before being sent down to the AC97 audio device. As previously described, MP3 coprocessor node may respond to upstream or downstream transactions, or both, based on system implementation. Because the MP3 co-processor block 25 only responds to transactions tagged as MP3 audio, it will leave differently tagged transactions intact, even if it is a transaction targeted at the audio device, but tagged as PCM audio, for instance.

Note that if the coprocessing being performed is decompression of data, it may be preferable to decompress data going downstream to decrease bus traffic. On the other hand, if the coprocessing task is compression of data, it may be desirable for that compression to occur on data going upstream to reduce traffic. In either case, the CPU would be relieved of the task. In order to provide flexibility, it some embodiments, it may be desirable to make the task performed by the coprocessor programmable with respect to looking at tags and performing processing on data streams going upstream and/or downstream.

Figure 4:
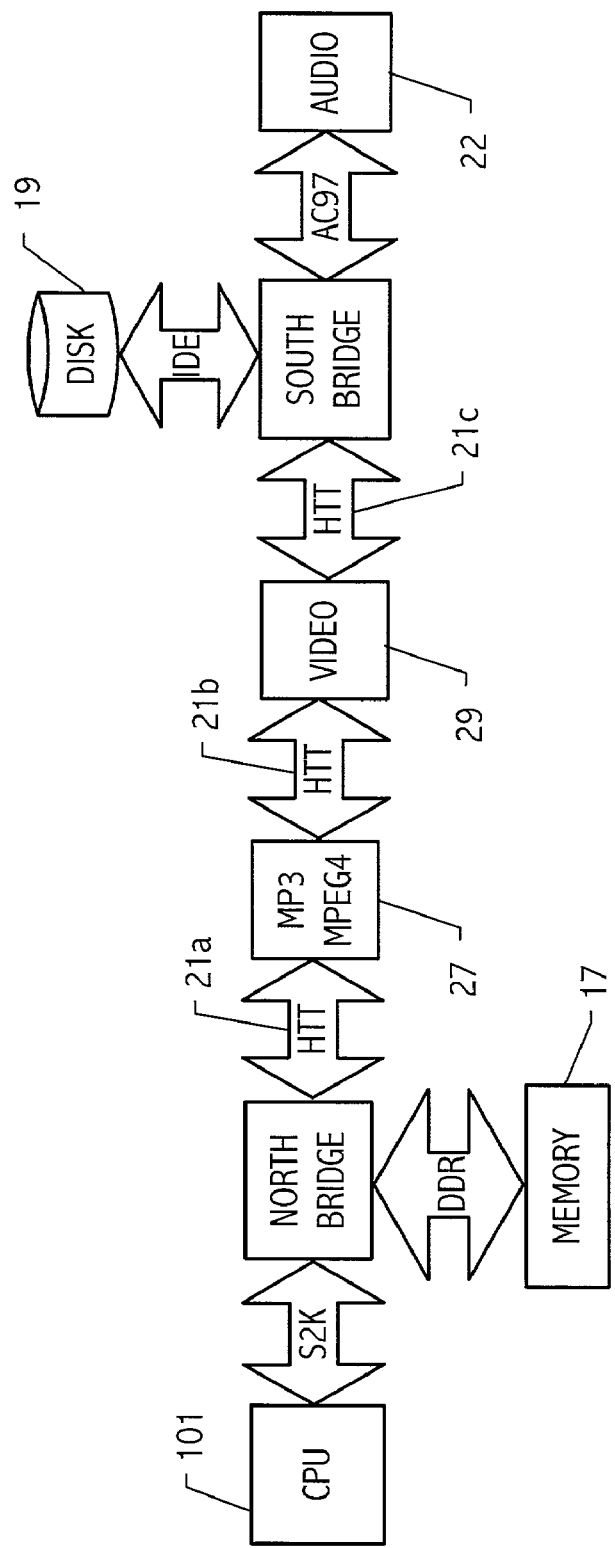
FIG. 4 is a block diagram of another system architecture suitable for exploiting an embodiment of the invention.

The use of tagged transactions also allows for multiple co-processor circuits to use a single communication link node to process more than one type of tag. For example, referring to FIG. 4, where the communication link is formed of three point to point links 21a, 21b, and 21c, if the transaction coming through the multi-purpose co-processor node 27 is tagged as MP3 audio, it is decompressed and the resultant PCM audio data is placed on the communication link destined to the audio device 22. If the transaction is, however, tagged as MPEG4 video data, that data is decoded and streamed down to the video playback device 29. Again, the processor 10 is offloaded of the decoding functions and is charged with less intensive managing functions.

Figure 5:
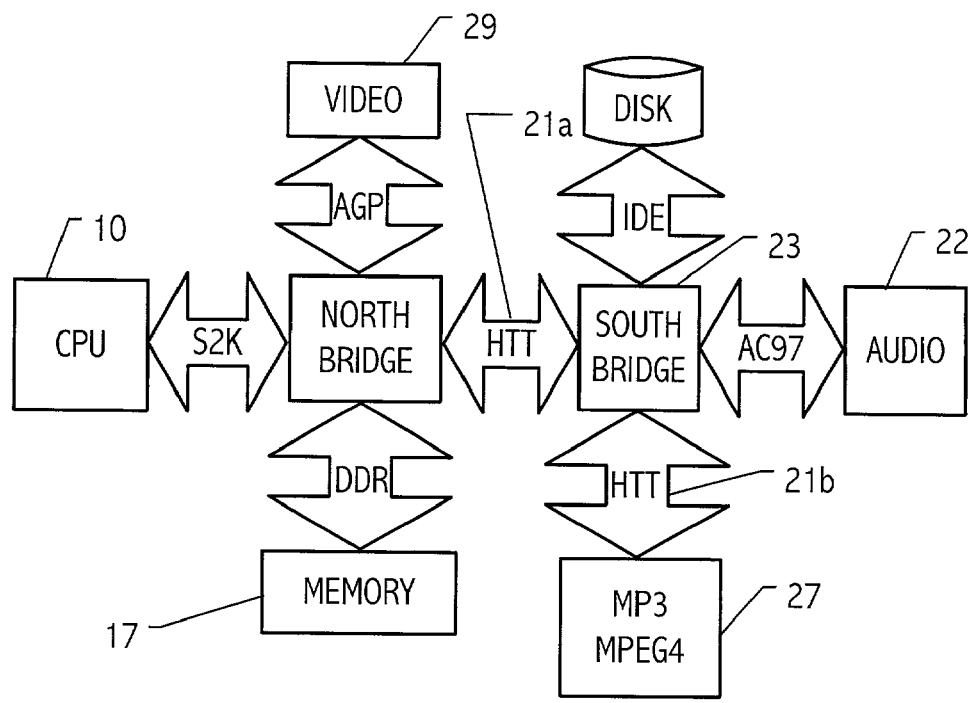
FIG. 5 is a block diagram of another system architecture suitable for exploiting an embodiment of the invention.

Because nodes can be aware of one another and of other devices in the system, the co-processor nodes can be placed at any location in the system. Referring to FIG. 5, MP3 audio data, for instance, is sent to the MP3 co-processor in multi-purpose co-processor node 27, which decodes it and sends the resulting PCM audio data (tagged as such) to the audio device 22. Similarly, MPEG4 video data may be sent to multi-purpose co-processor node 27, which processes the data and streams the decoded data to video device 29. Note that in the embodiment illustrated in FIG. 5, the south bridge (and other link devices potentially) route data based on data type. The south bridge 23 can route data multiple places as shown in FIG. 5 (upstream or downstream communication link 21a and 21b, respectively, IDE, and AC97). Note that a typical south bridge implementation also supports additional I/O protocols but the example has been simplified to facilitate understanding. Thus a transaction from multi-purpose co-processor node 27 tagged as PCM audio data is sent to audio device 22 based on the data type tag, while a transaction from multi-purpose co-processor node 27 tagged as video data is sent to video device 29. Thus, unlike the arrangement shown in FIG. 4, for example, the embodiment in FIG. 5 may give the system designer more flexibility to place coprocessor nodes anywhere on a communication link node.

Note that routing data based on data type may provide some advantage over address decoding since the number of data types is typically less than the address space. Further, configuration may be simpler since it may be easy for a device to know its data type than its address.

The tags may identify the data type, and in addition may specify a particular device that is to operate on that data or even a specific manufacturer. The tags may be included in the data stored, e.g., on audio or video disk or may be added once the data is supplied into the system, e.g., the tag may be added when the data enters into the first device on the communication link. Additionally, tags may be modified by the co-processor device(s) once the data has been filtered, decoded, transformed or otherwise appropriately processed according to the data type. Further, the data may be provided from a source external to the computer system, such as a wireless or wired network connection.

In such circumstances where data is supplied from a video or audio disk, or a video or audio stream via an external connection, data tagging may provide advantages in that data would not even have to be loaded into system memory 17. Instead, the data, tagged before or after entering the system may go straight from the disk (or network) source to the appropriate co-processor and then to the appropriate output device (e.g., speaker or display) after decoding. That can provide enhanced security to suppliers of the audio/video streams in that the streams are never stored in memory in the computer system. Avoiding loading data into memory also decrease the I/O bandwidth requirements by eliminating the loading of data from the disk into memory and from memory to the device. Additionally, it may further simplify the processor's managing role in the computer system.

Figure 6:
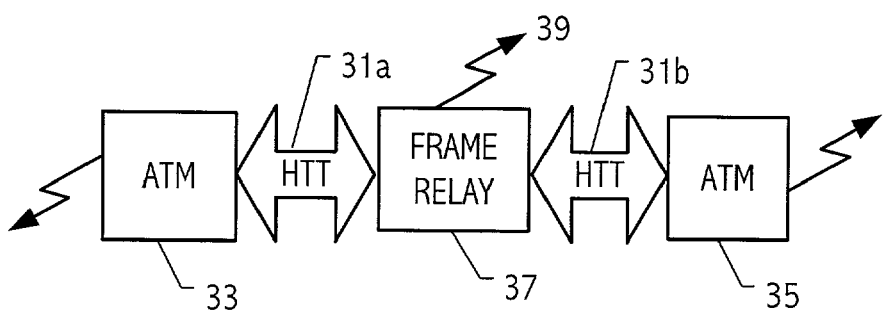
FIG. 6 is a block diagram of another type of electronic system suitable for exploiting an embodiment of the invention.

While data tagging is particularly useful in a personal computer context, it is more generally applicable to other types of electronic systems in which intelligence is required to route data. For example, it is possible to have a system such as a communications system use the same mechanism without control processor intervention. Referring to FIG. 6, a telecommunication network bridge can become a telecommunication router with an additional module. In this case, before adding the optional module, the system comprises an ATM bridge that connects two ATM networks 33 and 35 using the communication link formed by links 31*a* and 31*b*. By adding a Frame Relay routing module 37 between the two ATM ports, the device becomes a router that will now be able to route traffic to the appropriate networks. When an ATM module needs to send data to the Frame Relay module 37 so the data can be converted and forwarded to a frame relay network, the ATM module tags the data as frame relay data. When frame relay routing module 37 sees data identified as frame relay data, the data is captured, and the ATM protocol is converted to the appropriate frame relay protocol before being forwarded to the Frame Relay network over communication channel 39. Otherwise, if the data is destined for the other ATM module, the data is identified (by tagging) as ATM data, and the Frame Relay module passes the data on without processing it. Thus, the data tagging technique can be used whenever a function is associated with a node on a communication link and the function processes a particular data type and but other types of data are forwarded on the link without processing.

The exemplary embodiments shown herein improve a system performance by relieving the processor from certain tasks and making it available to do other ones. Moreover, it is possible to start with a base system and differentiate it according to specific needs by the addition of specialized co-processing nodes on the communication link. Using this method, customization is possible not only at the time of system manufacture, but in the channel by a value-added reseller, or by the end user.

Note that the description of the invention set forth herein is illustrative, and is not intended to limit the scope of the invention as set forth in the following claims. Other variations and modifications of the embodiments disclosed herein, may be made based on the description set forth herein, without departing from the scope and spirit of the invention as set forth in the following claims.

What is claimed is:

1. A method comprising:
    sending data over a communication link that includes a plurality of nodes coupled in a daisy chain by point to point connections between the nodes along with an identification of a data type of the data to a receiving node; and
    forwarding the data over the communication link to another one of the nodes on the communication link if the data type does not match a type processed by circuitry associated with the receiving node and processing the data if the data type matches the type processed by circuitry associated with the receiving node;
    wherein the identification of the data type identifies a manufacturer.

2. The method as recited in claim 1 further comprising transmitting data processed by the receiving node over the communication link.

3. The method as recited in claim 1 wherein multiple data types are associated with the receiving node.

4. The method as recited in claim 1 further comprising receiving the data from an external source and processing the data in the circuitry associated with the receiving node and forwarding the data to an output device without first storing the data in system memory.

5. The method as recited in claim 4 wherein the external source is nonvolatile storage associated with a computer system.

6. The method as recited in claim 4 wherein the data received from the external source includes the identification of the data type.

7. The method as recited in claim 4 wherein a node on the communication link that is coupled to the external source adds the identification of the data type after the data is received from the external source.

8. The method as recited in claim 4 wherein the external source is external to a computer system that includes the communication link.

9. The method as recited in claim 1 wherein data is forwarded in one of a plurality of possible directions according to the data type.

10. The method as recited in claim 1 further comprising forwarding or processing the data according to whether the data is going upstream or downstream over the communication link.

11. An apparatus comprising:
    a plurality of nodes coupled to a communication link, at least one of the nodes being part of a specialized integrated circuit coupled to process a particular data type, the communication link comprised of a plurality of point to point interconnections interconnecting the nodes in a daisy chain;
    wherein data is sent on the communication link with a destination of the data being identified by a data type identifier sent with the data;
    wherein data received by the at least one of the nodes is forwarded over the communication link without processing the data when the data type identifier identifies data not processed by the specialized integrated circuit on which the node resides and wherein data is processed by the specialized integrated circuit when the data type identifier identifies the particular type of data; and
    wherein the data type identifier identifies a manufacturer.

12. The apparatus as recited in claim 11 wherein the apparatus is a computer system.

13. An apparatus comprising:

a communication link;

a plurality of nodes coupled to the communication link; and means for forwarding data received at a receiving node over the communication link to another one of the nodes on the communication link if the data type does not match a type processed by circuitry associated with the receiving node and processing the data if the data type matches a type processed by circuitry associated with the receiving node;

wherein an identifier of the data type identifies a manufacturer.

14. A method of transporting data over a communication link having a plurality of nodes coupled by point to point links, comprising:

sending data over the communication link along with an identification of a data type of the data to a first receiving node; and forwarding the data with the identification of the data type to a second receiving node over the communication link or processing the data, according to whether the data type matches a type processed by circuitry associated with the first receiving node;

wherein the identification of the data type identifies a manufacturer.

15. The method as recited in claim 14 wherein the data type identifier identifies a class of data.

16. The method as recited in claim 14 wherein the data type identifier identifies a specific device.

17. The method as recited in claim 14 further comprising forwarding or processing the data according to whether the data is going upstream or downstream over the communication link.

* * * * *